United States Patent
Schilit et al.

(10) Patent No.: US 6,674,453 B1
(45) Date of Patent: Jan. 6, 2004

(54) SERVICE PORTAL FOR LINKS SEPARATED FROM WEB CONTENT

(75) Inventors: William N. Schilit, Menlo Park, CA (US); Jonathan James Trevor, Santa Clara, CA (US); Catherine Claire Marshall, San Francisco, CA (US); Elizabeth F. Churchill, San Francisco, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 379 days.

(21) Appl. No.: 09/613,002

(22) Filed: Jul. 10, 2000

(51) Int. Cl.$^7$ .............................. G09G 5/00; G06F 17/00
(52) U.S. Cl. .................... 345/810; 345/760; 345/864; 715/501.1
(58) Field of Search ................... 345/760, 853, 345/864, 808, 810; 715/501.1, 513, 907

(56) References Cited

U.S. PATENT DOCUMENTS

| | | | |
|---|---|---|---|
| 5,862,321 A | * 1/1999 | Lamming et al. | 709/200 |
| 5,937,041 A | 8/1999 | Cardillo, IV et al. | 379/93.25 |
| 6,011,546 A | 1/2000 | Bertram | 345/700 |
| 6,023,701 A | * 2/2000 | Malik et al. | 707/10 |
| 6,070,176 A | 5/2000 | Downs et al. | 707/513 |
| 6,356,287 B1 | * 3/2002 | Ruberry et al. | 345/864 |

OTHER PUBLICATIONS

Sams Teach Yourself Microsoft Internet Explorer 5 in 24 Hours. Jill Freeze. Sams Publishing. 1999. Pp. 198 and 387–389.*

Flynn, et al., The Satchel System Architecture Mobile Access to Documents and Services, 1999, found at http://www.rxrc.xerox.com/publis/cam-trs/html/lamming.htm.

Eldridge, et al., Studies for Mobile Documents Work and Their Contributions to the Sachel Product, 1999, found at http://www.rxrc.xerox.com/publis/cam-trs/html/lamming.htm.

Lamming, et. al., Satchel Providing Access to Any Document, Any Time Anywhere, 1999, found at http://www.rxrc.xerox.com/publis/cam-trs/html/lamming.htm.

Robin Cover, The XML Cover Pages, Jun. 27, 2000, pp. 1–14 of 13, found at http://www.oasis-open.org/cover/wap-wml.htm.

* cited by examiner

Primary Examiner—John Cabeca
Assistant Examiner—Brian Detwiler
(74) Attorney, Agent, or Firm—Fliesler Dubb Meyer & Lovejoy, LLP

(57) ABSTRACT

A Web browser provides the ability to separate content and hyper-links from a Web page and provides a list of the links for viewing on a mobile device display screen, and once a link is selected using the mobile device, a services portal link is provided to the mobile device display to provide selection of services to be performed on the selected link, such as faxing or printing. Further, the services are made link dependent, or user dependent so that specific services can be displayed depending on factors such as the availability of services provided specifically from a Web page owner for link dependent services, or for the location of a user relative to a print service provider for user dependent services.

7 Claims, 4 Drawing Sheets

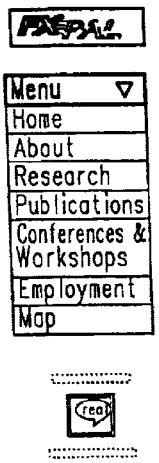

FX Palo Alto Laboratory

3400 Hillview Ave Bldg 4 – Palo Alto CA 94304 – 650.813.7765 FAX 650.813.7081

Incorporated in 1995, FX Palo Alto Laboratory (FXPAL) is an expanding laboratory researching software and information technology for Fuji-Xerox Co., Ltd. Fuji-Xerox serves as the hub for the Xerox Group's operations in the fast-growing Asian and Southern Pacific regions. Located in Silicon Valley on the Xerox Palo Alto campus, FXPAL is the newest member of the Xerox global research community.

FXPAL's Mission

FXPAL plans to shape the "office of the future" and the "document of the future" and provide Fuji Xerox a digital information technology base for the 21st century. This goal is accomplished through:

- Research in core software technologies
- Work with selected universities to develop and transition information technologies
- Interaction with the US software industry to help tailor new products for FX systems and applications

*FIG. 5A*

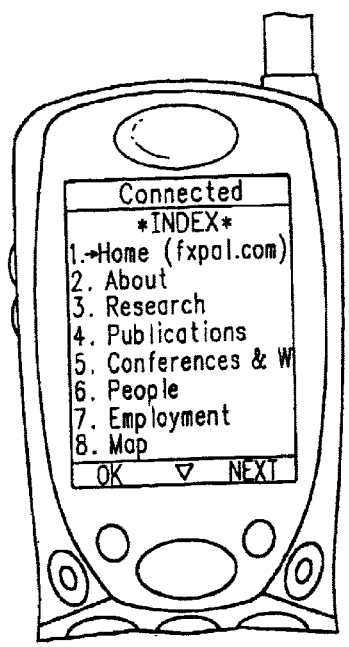

*FIG. 5B*

SERVICE PORTAL FOR LINKS SEPARATED FROM WEB CONTENT

BACKGROUND OF THE INVENTION

1. Field of the Invention

The present invention relates to a method for reformatting information from the World Wide Web (WWW or Web) so that it can be more effectively used on mobile devices.

2. Description of the Related Art

The Internet, fueled by the popularity of the Web, has exhibited significant growth over the past few years. At present, to access the information on the Web, users typically use standard computer equipment, such as a home personal computer with a display and modem, and an Internet connection.

There have been efforts to expand the number of users and the ease with which they access the Internet. For example, several companies have developed television set-top boxes that permit users to browse or "surf" the Internet from their television sets. In addition, telephone companies have joined with software developers to allow mobile communication devices such as cellular telephones, pagers, and personal digital assistants (PDAs-such as the 3COM Palm Pilot) to access some features of the Internet.

Presently, several types of Internet connections are available. For example, to use an Internet connection from Internet Service Providers (ISPs), the user dials into a computer at the ISP's facility using a modem and standard telephone line. The ISP's computer in turn provides the user with access to the Internet. Through this Internet connection, the user can access information on the Web using a computer program called a "Web browser," such as for example the Netscape Navigators™ from Netscape Communications Corporation. The Web browser is a software program that allows a user to view the data received from an Internet site location. To accomplish this, the user gives the Web browser a Uniform Resource Locator (URL) for an object on the Internet, for example, a data file containing information of interest. The document is referred to as a "Web page," and the information contained in the Web page is called content. Web pages often refer to other Web pages using "hypertext links", also referred to as "hyper-links", or simply as "links". The links are typically associated with words, phrases, or images representing the other pages in a form that gives the browser the URL for the corresponding Web page when the user selects a link.

Links are made possible by building Web pages using a Hypertext Markup Language (HTML), an evolving markup language standard which is used to construct documents in a uniform, standardized format so they may be accessed by Web browsers and displayed for the user. HTML is an ASCII text-based markup language which defines page or frame formats used to display the HTML elements. To provide the hypertext linking, most documents contain "anchor" words, phrases or images. The anchors serve as visible starting points for links. The anchor, or the HTML <A> element, includes a URL that uniquely identifies the endpoint of the link, or the destination document or Web page that will be activated when the link is selected.

Once the user selects a URL for a site either directly or through a link, the URL can be used to identify a specific host computer on the Internet called a "Web Server," along with a location of the Web page located on the Web Server. The Web browser retrieves the Web page and displays it for the user.

Hypertext Transfer Protocol (HTTP) is a common network protocol used by the browser to access and link users with various other Web pages or sites referenced by the original Web page. HTTP requires a program running on the host computer that understands and responds to the protocol or formatting of the link's content. The file retrieved might be, for example, an HTML file, a graphics file, a sound file, a PowerPoint™ file, or a word processing file. Whether the file can be retrieved or handled depends on the features and capabilities of the browser.

When a browser requests a specific URL, it sends the request to the Web server. The Web server receives the request and attempts to fill it. There are several ways the user requests can be filled. For example, Web servers can translate a request such as "http://www.recipes.com/recipes/soup.htm" into a search for a physical file on that server. It would start from the base category for the domain and then apply the path that was requested. In this example, the Web server would look for a category called "recipes" and then look for a file called "soup.htm" within that category. If the file was found it would be passed back, without modification, to the requesting browser. In this way, the URL can be thought of as a specific file sitting on a server, or host computer.

HTML can be translated from other standard generalized markup languages, such as Wireless Markup Language (WML). WML was developed by the Wireless Application Protocol (WAP) Forum, which was founded by Ericsson, Motorola, Nokia and Unwired Planet. WML was developed as a global wireless protocol specification intended for use in specifying content and user interface for narrowband devices, including cellular telephones and pagers, to allow users mobile access to the resources of the Internet. WML is based on XML (extensible Markup Language).

While computer terminals and other devices that are configured to receive HTTP signals and HTML files may utilize the above methods to access and view the Internet data, the display capabilities for on screen-display mobile devices, such as cellular phones, allow only a limited view of the HTML files.

Recently systems have been developed to make browsing the Web more feasible for handheld devices. One such system, referred to as "Satchel", was disclosed by employees of Xerox Research Center Europe. See, Mike Flynn, et al., "*The Satchel System Architecture*: Mobile Access to Documents and Services", Mobile Networks & Applications, 1.5, Issue 4, 243–258, December 2000. The Satchel Browser provides the ability to browse categories for documents and also provides the ability to invoke services, such as printing, or faxing, once the document has been retrieved.

The Satchel Browser typically displays categories, rather than the text of documents themselves because of limits of transmission bandwidth, storage requirements, screen size and resolution on mobile handheld devices. For example, with a pager-type mobile device which has a two line screen, as illustrated in FIG. 1, displaying an entire Web page would not be desirable. A mobile device with a larger display and capabilities, such as the Nokia 9000 Communicator shown in FIG. 2, makes viewing larger blocks of text possible, but a display which includes four to six lines as opposed to two still is not a desirable viewing area for an entire Web page.

FIG. 3 illustrates how Satchel operates to provide a category of documents to the display of the Nokia 9000 Communicator, shown in FIG. 2. Upon turning on the mobile device the Satchel start menu is activated to allow a series of user selected categories to be displayed. One of the categories can then be selected by the user and opened by selecting the "Open" command to provide a display of the contents of the category. To return to the previous category, a user selects the "Close" command. The contents of a category may be files, or links which can be used to identify documents in a single line.

Once a document is selected, the "Services" command can be selected to provide a list of services which can be performed for any file identified. An example of the services provided is illustrated in FIG. 4. As shown, once the file is opened, it can be printed, faxed or emailed by selecting one of items shown. Viewing is also made available, but upon selecting viewing the content of the file is provided in a linear manner to the limited sized screen for the user a line at a time. With the limited viewing area, it is expected that the user would prefer to use one of the other services to obtain the contents of the file rather than viewing.

The Satchel system uses a format termed Halibut which is translated from HTML. The Halibut translation does not allow large images, movies, or other non-HTML files to be transmitted over the low-bandwidth link to the mobile device.

Further, the documents provided for selection in the Satchel system are predefined by a user and stored in a category structure in a system repository. In creating selection list of links for documents, this predefined category structure within the Satchel repository is used. It is a disadvantage of the system that the user is required to pre-define a category structure and select from this structure instead of navigating the hyperlink structure already contained in the hypertext content. Moreover, if the user wishes to find document B that is linked within document A, then the user must read through document A's content on a small display until the link, comes into view. In this way, the Web page content itself provides a hindrance for the user in making a quick link selection on a mobile display.

Another system for providing Web access for handheld devices is Mobile Google. Mobile Google uses a search engine to address the problem of link selection. The user enters a search term and the system presents a search result list of links to Web pages. A link from the list can be selected whereupon the Web page content is displayed in a linear manner according to the constraints of the limited sized screen. Again, the amount of text in a Web page leads to viewing a few lines at a time on mobile devices, and makes selecting a link within the page difficult. Further, a disadvantage of this and other search-based techniques is that in order to obtain a short list of precise results the user must enter many terms on a device where input is difficult.

Systems such as Mobile Google and Satchel provide a mechanism for mobile e-commerce (or m-commerce) in that they let users select a bit of content from a mobile device. However, the disadvantage of these and other current systems is that selection of the content is constrained to predefined lists or large numbers of search results. In addition, the services or operations permitted for either the Satchel system or Mobile Google are limited.

SUMMARY OF THE INVENTION

In accordance with the present invention, to overcome the disadvantages described, it was first recognized that users access Web pages on a mobile device in a modal manner—either the user wishes to perform some service on content (such as viewing the content itself), or the user is looking to select a particular hyper-link provided within the content.

In accordance with the present invention a method for m-commerce is provided which separates hyper-links from content of a Web page. The separated hyper-links are then used to provide a category of items for selection on a mobile device display. In addition to the hyper-links from the web page, data detection is further performed to identify and create new links particularly applicable to mobile devices, such as to telephone numbers, addresses or email addresses.

Further in accordance with the present invention, a services portal is provided once a link from the mobile-device display is selected. The service portal presents a list of services that can be performed on the selected link's document of the link itself. The services list includes actions such as faxing, printing, mailing, and viewing.

An important aspect of the service portal is that it allows a number of stake-holders, such as users and content providers, to dynamically contribute to the items shown in the services list. A number of databases of services are accessed when the services portal is selected so that like-dependent, user-dependent, and content-provider-dependent services can be provided. For example, when a user goes to a Web site that sells books and selects a link to a Web page that describes a book, the site may insert a special item in the services menu for ordering the book. The Web site owner can offer additional services for their own content by storing a publically readable database of services with an agreed upon name within their Web server that is aggregated by the services portal. Further, link dependent services may be provided depending on the format of the link, such as if the document linked is provided in WordPerfect™ or PowerPoint™ point format.

In another aspect of the present invention, the services portal enables a dynamic contribution to the items in the services list dependent on the specific user. To provide such user dependent services, the services portal can monitor selections of specific users so that user service preferences can be provided with links dependent on the user's preferences. Further, the user location can be monitored to provide links to services which are conveniently close by, such as the nearest print service. Further, the type of mobile device a user is operating, such as a mobile phone or laptop, can be monitored to provide services specifically for the mobile device type.

BRIEF DESCRIPTION OF THE DRAWINGS

Further details of the present invention are explained with the help of the attached drawings in which:

FIG. 5A shows contents and links provided in the FXPAL Web page;

FIG. 5B shows how links are provided from the FXPAL Web page in an index list on a Sprint PCS mobile phone in accordance with the present invention;

DETAILED DESCRIPTION

I. Overview

The present invention provides a Web Browser, referred to herein as "m-link", which converts HTML documents for displaying on a mobile display. The m-link program accesses a server to retrieve a document as identified by a user-selected URL. The document received from the server is then parsed and hyper-links provided in the document are separated from the content. The hyper-links are processed, re-organized, and provided for display on the mobile device.

In addition to the hyper-links, m-link can search through the content and create links where hyper-links were not provided within the Web page. For example, telephone numbers can be displayed as links, since a mobile device typically offers telephone capabilities. The telephone number link is configured so that when it is selected, the telephone number is dialed.

Once the links are displayed, the mobile-device keypad can then be used to navigate to and select one of the displayed links. A list of situation, or context-appropriate services, such as printing or faxing, is then provided to the mobile device display after a link is selected enabling a service selected from a list to be performed on the selected link.

II. Separation of Links From Content

FIGS. 5A and 5B illustrate how m-link can separate and display links from the Web page with the URL identification "www.fxpal.com". The Web page is provided for the Fuji-Xerox (FX) Palo Alto Laboratory in Palo Alto, Calif. FIG. 5A shows contents and links provided in the FXPAL Web page. FIG. 5B shows how links are provided from the FXPAL Web page in an index list on a Sprint PCS mobile phone. The keypad of the cellular phone can be used to select a desired link for services to be performed. Only a limited number of the links from the FXPAL Web page of FIG. 5A are listed on the PCS phone display in FIG. 5B, so the keypad of the PCS phone must be used to scroll down to find a desired link. The links are provided to the display in FIG. 5B in the order they are provided on the Web page, although the links can be reordered as described in more detail in sections to follow.

A. Using Document Structure to Organize Links

As indicated with respect to FIG. 5B, the links in one embodiment are provided to the mobile display in the order they are, found in the Web site. In an alternative embodiment, links can be organized for display on the mobile device based on other aspects of the structure of the document. For example, in one embodiment, organization of the links is reconfigured so that links with the most duplicates are displayed on the mobile device display first. In another embodiment, links which have a larger size are displayed first. In another embodiment, links which identify documents with the largest content are displayed first.

B. Placing Links In Categories

Figure 1:
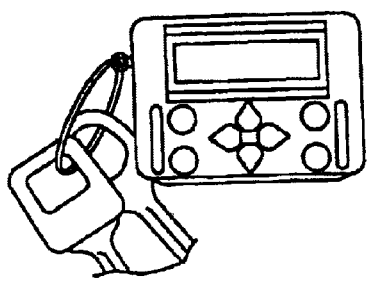
FIG. 1 shows a pager-type mobile device with a two line display screen.
Figure 2:
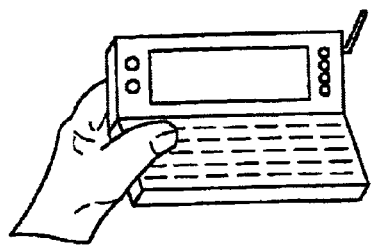
FIG. 2 shows a Nokia 9000 Communicator.
Figure 3:
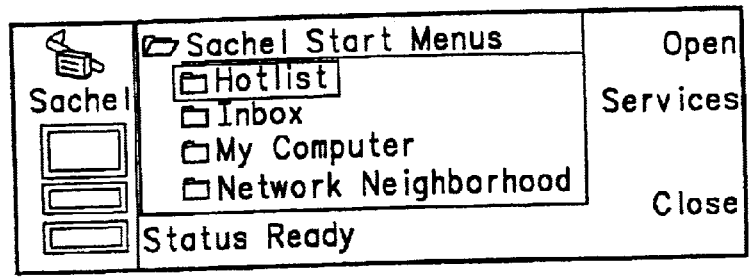
FIG. 3 shows how a Satchel Browser program operates to provide a category of documents to the display of the Nokia 9000 Communicator.
Figure 4:
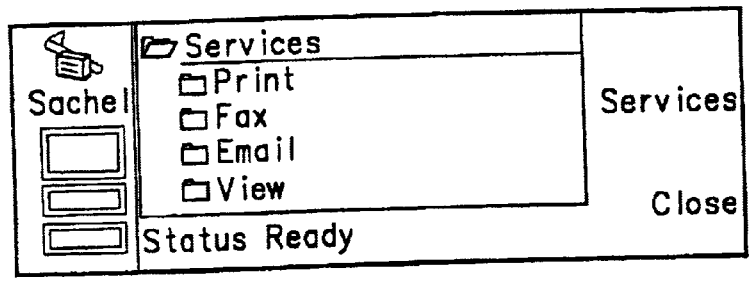
FIG. 4 shows an example of services provided by the Satchel Browser.
Figure 6A:
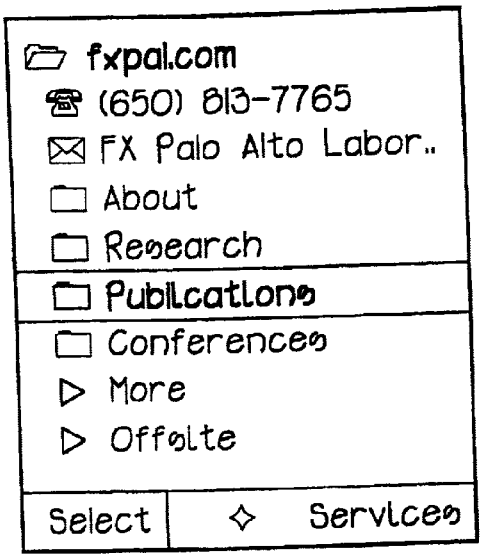
FIG. 6A shows an alternative embodiment for displaying links from the FXPAL Web page with links reorganized for better viewer accessability, and new links for a telephone number and an address provided.
Figure 6B:
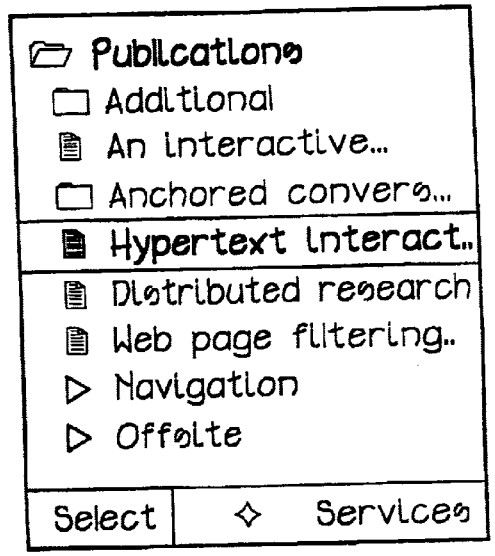
FIG. 6B shows links provided after selection of the publications link in FIG. 6A.
Figure 6C:
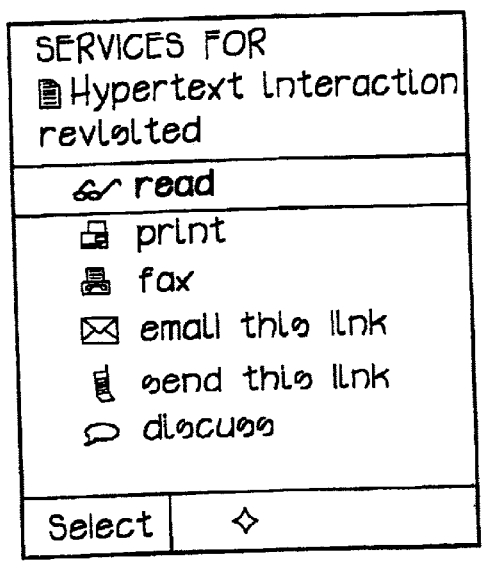
FIG. 6C shows services available for the "Hypertext interact . . . " publication link from FIG. 6B.

FIGS. 6A–6C shows an embodiment of m-link which organizes links by putting less desirable links in categories. In FIG. 6A, links which refer to documents offsite from the FXPAL Web page are provided in a category labeled "Offsite", while links from the FXPAL Web site which refer to contents within the FXPAL Web page itself are still displayed. It is anticipated that; the offsite documents will be less desirable for viewing because if the user has selected the FXPAL Web site, the user is likely to be seeking information from within the Web page, rather than offsite links. Further in FIG. 6A, only a number of the links which are onsite are listed, and a category labeled "More" is provided for accessing the remaining links. FIG. 6A further shows how that m-link has been configured to provide select and services key selections for the PCS phone display, and that a user has navigated to the "publications" category. The "publications" category provides access to another set of links to specific publications authored by employees of FXPAL.

FIG. 6B shows the mobile phone display when the "publications" category has been navigated to, as in FIG. 6A, and the "select" key depressed. As in FIG. 6A, in FIG. 6B a number of links are provided to publications which are offsite from the FXPAL Web page, and these links are stored in an a category labeled "Offsite", similar to offsite links from the display list in FIG. 6A. Further, a link labeled "Navigation" is provided in the display in FIG. 6B to enable a user to return to the previous list of links in FIG. 6A. FIG. 6B further illustrates that the user has navigated to the publication document identified by the link labeled "Hypertext interact . . . " Additional links to other publications, such as the link labeled "An interactive . . . " and "Anchored convers . . . " are further provided.

C. User Control of Link List Organization

M-links can be set to allow user control of the organization of links displayed to a mobile device. In a setup menu for the mobile device, the user can control selection of the link organization, such as if links are displayed in the order they are found in a Web page, if they are displayed in order of the size of the links, in an alphabetical order, or otherwise. The user can also select whether offsite links are simply listed or provided in a separate category. Further, the user can select if links which cannot be displayed on one display are placed in a separate "more" category, or if the user wishes to scroll down through the links to bring the links up on the display.

M-links can also be set to allow a user to constrain the type of links displayed. For example, the user can limit the type of links listed to one or more specific types, such as WordPerfect™ documents, or PowerPoint™ documents. The user can set the constraints in either a setup menu or with a constraint supplied when the link is selected.

User past behavior can also be used to control the organization of links on a mobile device display. Studies have shown that it is likely that a user will follow much of the same path over and over again when navigating and opening links. Accordingly, m-links can be organized so that the links are organized for display with the links most previously accessed displayed first. Thus, if the server end recognizes that one of the on-site links it has extracted is one that the user followed before or followed recently, it can place it at or near the top of the list of links for a page. The number of times a user has navigated to a link, as opposed to how recently individual links were accessed, can further be used to determine the organization of links for display.

D. Listing Links From Multiple Documents

M-link in one embodiment can be configured to identify links in more than one document, and then include the links all in one list for displaying. The multiple documents can be identified from multiple user link inputs. M-link can also be configured so that the documents are all identified from links identified in one document identified by a user. M-links can also be configured so that all documents at a site identified by the user are used. For example, a user may wish to identify all WordPerfect™ files at a site identified by the user. Thus, m-link would access the Web page identified by the user, identify all the links and list all links in a WordPerfect™ format. M-links would then further access each of the links from the Web page separately and identify all the WordPerfect™ format files found in those documents. All of the WordPerfect™ file links would then be provided as a list on a mobile device display.

E. Labeling Links

Links can be provided in a Web page either as images or text. For text, a link label for providing to a mobile display can be easily obtained using the anchor text, or a portion of the anchor text if the phrase associated with the anchor is too long to display in its entirety on a mobile device. For images, a link label must be determined.

To determine a label for an image, the ALT, or alternative identification provided with the link can be used as a label. The ALT label is used when, for instance, a user is blind and the link must be audibly expressed to the user, or when the image for one reason or another cannot be retrieved or displayed. But, some programmers do not put in an ALT field label for an image. If no ALT label is provided, the URL for the link can be used to provide a label. Further, if no ALT label exists, other duplicate links might be identified somewhere else within the Web page with a text label or ALT label. A search through the Web page or Web site for other links with the same URL code will typically identify a duplicate link with a text label which can be used for labeling the previously unlabeled link.

F. Elimination of Duplicate Links

More than one hyper-link is typically provided in a Web page or Web site for more important links. Because it is undesirable to provide more than one of the same link to limited mobile device display, the m-link program in one embodiment is configured to search through the URLs of the link list and eliminate multiple occurrences of the same URL.

II. Creating Links not Hyper-linked In Web Page For Mobile Devices

In one embodiment, m-link serves as a data detector to identify and create links for display which are not hyper-link in a Web site. The data chosen for links can be particularly relevant for mobile displays, for example telephone numbers for mobile phone displays as described in more detail below.

A first link created from Web page data, as illustrated in FIG. 6A, is the telephone number for the operator at FXPAL identified in the FXPAL Web page. Since a mobile device typically provides telephone capabilities, one of the features of a Web page a user typically looks for is telephone numbers. As indicated previously, because of the limited display size on mobile devices, a user will not typically want to view the entire content of a Web page. To make the link listing more accommodating to a mobile user, in one embodiment m-link searches through the content of the Web page to identify telephone numbers. Links are provided for the identified telephone numbers and listed on the mobile device display as shown in FIG. 6A. The link for the telephone number display is configured by m-link so that when the link is selected the telephone number is dialed. The telephone number link is provided as the first link because it is likely a more desirable link to be accessed by a user of a mobile device.

A second link shown created in FIG. 6A is the address for FXPAL which is the link identified by the label "FX Palo Alto Labor . . . ". In addition to the telephone number, a mobile device user will likely find addresses in the Web page desirable so that a map to the address can be displayed for the address location where the user may wish to travel. Thus, in one embodiment m-link parses through the content of the Web page to identify addresses. Links are provided for the identified addresses and listed after telephone numbers on the mobile device display, as illustrated by the link labeled "FX Palo Alto Labor . . . ," in FIG. 6A. Once this link is selected, the FXPAL address is displayed. Services may then be selected for the address including providing a map locating the address.

A third link which can be detected from content data is email addresses. Particularly with mobile telephones, PDAs and pagers now offering email capabilities, a user may be linking to a Web page to identify an email address for a company or individual listed in the Web page for contacting. An email link in particular makes sense when a Web page is accessed from devices such as two-way pagers. Much like a telephone number is the most desired item for communication when the user is browsing the Web from a mobile phone, email in many instances can be the most desired form of communication when the user is browsing the Web using a two-way pager.

IV. Link Services Portal With Dynamic Services

Once a link has been selected, m-link provides a service portal with the link which is displayed. Effectively upon selection of a link, m-link sends the URL for the selected link to the service portal. The services menu items will typically be fetched from a database stored with the m-link navigator software, while the URL for the selected link will be accessed from a Web server. In addition, services offered by the content provider are fetched from a database or data file stored at and managed by the site owner.

FIG. 6C shows the PCS phone display after the "services" key is activated when the link "hypertext interact . . . " has been selected as shown in FIG. 6B. As shown in FIG. 6C, the services made available by m-link for the document "Hypertext interaction revisited" include reading, printing, faxing, emailing, sending and discussing. The reading link allows the user to view the content of the link line by line in a linear fashion using the PCS phone display. Printing, faxing and emailing the link are further available and are self explanatory. Sending the link can be performed when the mobile device being used has pager capabilities. When sending is selected, the URL code for the link is provided to a selected recipient as a pager message. Discussing the link can also be performed when the mobile device has telephone capabilities. When discussion is selected, the user can enter a telephone number of person with whom he wishes to discuss the link.

A. Access For Link Service Providers

Although the services shown in FIG. 6C may all be provided by a single supplier such as a service provider hosting the m-link browsing software, at least one of the services provided in one embodiment can be configured to be provided by a separate service provider. For example, services such as printing or faxing may be provided through Kinkos™ or Mail Boxes etc.™. Emailing can be provided using a specific service, such as Microsoft Outlook™, or Eudoram™. Also, m-link can configure the services selection so that a service, such as "print", is a category providing access to the multiple service providers for the category item.

B. Providing Link Dependent Services

The services which are link dependent can be one of the standard services from a default list, such as printing, faxing or the other services shown as shown in FIG. 6. But, the link services listing can be modified to make it dynamic by including additional special links.

In one instance, the link services can be made dependent on the link content providers or service providers, referred to herein subsequently as the link owner. For example, with the IEEE Web site www.ieee.com, a service for ordering a document such as a book or publication from IEEE might be added.

Not only specialized links, such as ordering, but standard services such as printing or faxing can be made link owner dependent. For example, if the link accessed provides a printing or faxing service, the printing or faxing links can be changed to allow printing or faxing to be provided from the specific link.

In addition to making the service links dependent on services provided by the owner of the link, the services provided can be made dependent on the format of the link. For instance, if the document accessed is a WordPerfect™ file, the "read" or "print" services can be configured to use WordPerfect™. Similarly, if the file is a PowerPoint™ file, the "read" or "print" services can be configured to use PowerPoint™.

In addition to the service list being dependent on the link owner, or format type, the services can be made dependent on the link content language, age or size. For example, a "Translate to English" service might be provided for links to files in french. A table of contents creation service might be provided for larger size documents.

The ordering of services displayed when a link is accessed can be either a standard default list with link dependent services added at either the top or bottom of the list, or the link order can be set to change depending on the link accessed. For example, with a link to a book or publication provided from the IEEE Web page identified above, ordering is the most likely desired service. Accordingly, the service links as shown in FIG. 6A can be ordered so that the ordering link is provided first, while less desirable links like send or discuss are put in a category labeled "more" for links which will not fit within the screen display size.

A database of services will be provided on a host computer providing m-link in accordance with the present invention. The database will be configured to include standard services, such as printing of faxing shown in FIG. 6B. The database is made dynamic by including specialized services for individual links based on the link owner or link type. The individual links in the database can be identified by the URL code of the link selected by the user. Less specific links can furthermore be provided, such as for all WordPerfect™ files, based on the format identifier in the URL code of the WordPerfect™ link selected by a user, such as ".wpd" for a WordPerfect™ file.

With a dynamic list of services stored with a link, another service which can be provided for a link is the bundling of the link with a service. The bundling will be beneficial for instance if a user wishes to email a link to another mobile device user. The bundled services will be transmitted with the link in an email so that when the second user accesses the link, the second user receives the list of dynamic services for performing on the link, rather than the content of he link itself which may be difficult to view on a mobile device.

C. Providing User Dependent Link Services

In addition to making link services dependent on the link characteristics, link services also depend user characteristics, such as the users location, the type of communication device the user is using, or the cost of services the user is willing to pay for.

To identify services characterized by the user when a link is accessed, a user specific preference of services can be identified in a setup menu, as well as a dynamic determination of preferences which are identified based on services previously used by a specific user. For instance, a particular user may use printing or faxing more consistently than any of the other services, so m-link can be configured to recognize this and configure the services list accordingly. Further, the services portal can be configured to display services preselected by the user as a default, or in a link dependent manner. In a similar manner, cost of services can be used to identify services a particular user desires based on the cost of items a user normally chooses, or on costs the user specifically selects. If the mobile device is used by multiple users, a logging in procedure for the device can be used, and then services identified which are more likely used for each specific user can be stored and displayed accordingly.

The services identified for the link can further be made dependent on the display device. For example, if the display device is a PDA which does not act as a telephone, then the discuss link can be removed from the display. Further, if the mobile device used is a laptop, as opposed to a cell phone, the laptop will typically have a larger display size and colors, so a different layout of links can be provided along with different services tailored to the specific device.

The services portal provided for the link can further be made dependent on the location of the user at the time the link is accessed. A location aware service can, for example, direct the printing service to a close by print shop if the mobile device has the capability of identifying the users location. The mobile device could further give the user a choice of several nearby print shops, either in a separate print category, or simply in a list of available printing options along with other listed services. The print service link can further be configured to provide an address link for the print shop along with a map link.

V. System Architecture

Figure 7:
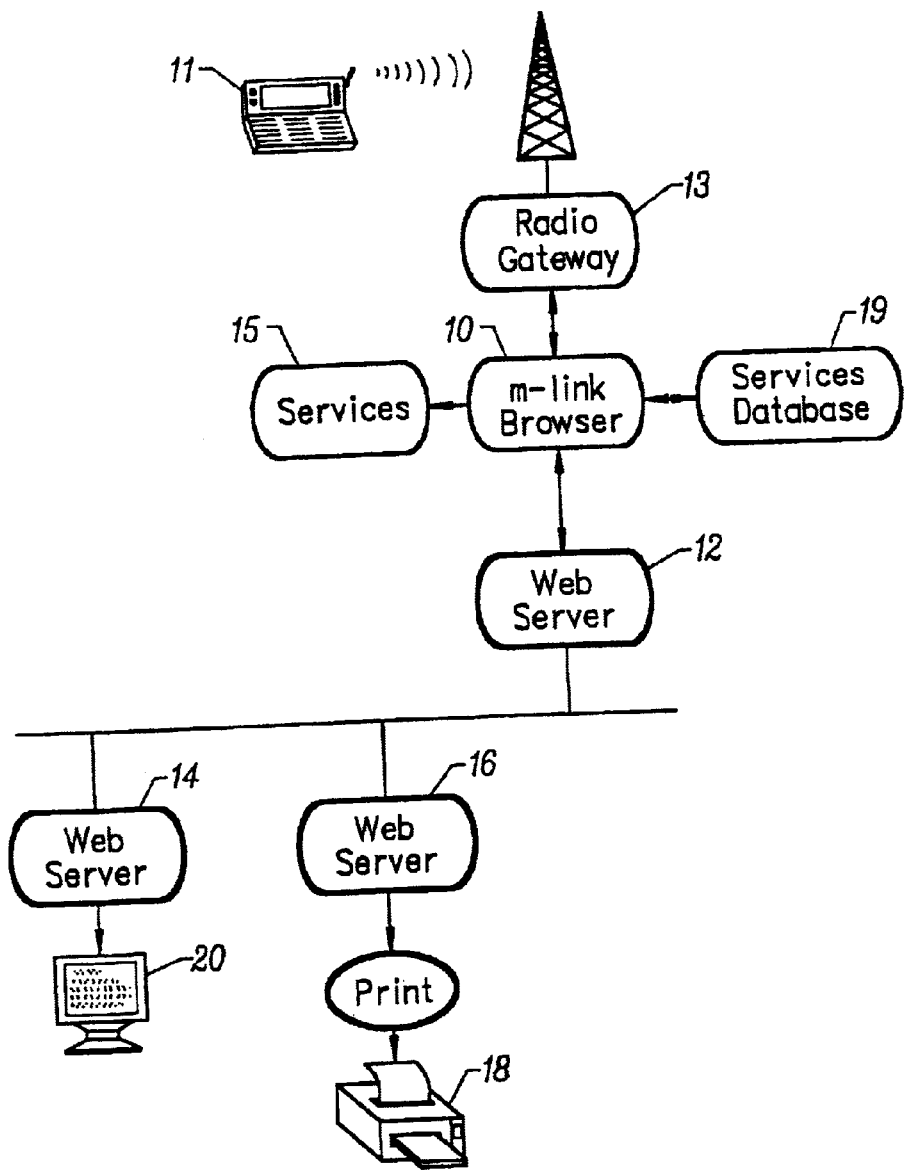
FIG. 7 shows components for a system architecture in accordance with the present invention.

FIG. 7 shows components for the system architecture for supporting m-link. M-link operates as a browser 10 which translates HTML for transmission and efficient display on a mobile-device 11. M-link browser 10 accesses a server 12 to retrieve a document as identified by the user selected URL. The URL is used to identify a document on another server, such as server 14. The document provided from server 14 back to the server 12 as identified by the URL code is then parsed and hyper-links provided in the document are separated from the content by the m-link browser 10. The hyper-links are then processed, reorganized, bundled with services by the m-link browser and provided over a radio gateway 13 to the mobile device subscriber 11.

To minimize transmissions over relatively low-bandwidth wireless connections, the m-link browser typically separates and transmits links to mobile-devices, as indicated above. Similarly, the link, along with a service link is transmitted back from the mobile device 11 to the browser 10. Information may also be transmitted, such as the type of mobile-device display the user is using, or the identity of the user to allow m-link to provide dynamic services. However, typically wireless traffic includes mainly groups of links enabling rapid transmission over relatively low-bandwidth connections.

Services such as printing can be provided directly from the m-link enabled devices 15, and the server 12 will not have to be accessed for such services. Services may also be provided to other specific service providers on servers outside the server 12 connected to the m-link browser 10. Offsite services accessed by m-link will be transmitted from the m-link browser 10 through the server 12 to a server identified for the desired service provider. For example, if the service is printing to a printing service 18 which uses Web server 16, then the m-link browser 10 would send the link designated for the service through servers 12 and 16 to the print service provider 18. If the service is an email provided to a computer 20 on server 14, the m-link browser 10 would email the link designated for the service through servers 12 and 14 to the computer 20.

With m-link providing dynamic services, a service portal database 19 is provided which is accessible by the m-link browser software 10. When a link is selected by a user 11, services designated for the link are accessed from the service portal database 19 and provided with the link to the user's mobile device 11. For user dependent services, m-link can be configured to include software to determine user preferences based on user selections and update the database 19 accordingly. Similarly, service providers for specific links can be updated in the database 19 by a system administrator for m-link.

Although the present invention has been described above with particularity, this was merely to teach one of ordinary skill in the art how to make and use the invention. Many additional modifications will fall within the scope of the invention, as that scope is defined by the claims which follow.

What is claimed is:

1. A method for providing access to services when a Web page is accessed by a user comprising the steps of:

receiving a URL code from a user;

retrieving a set of links from the Web page identified by the URL code;

displaying the list of links;

receiving a user selection of a given one of the links from the list of links;

retrieving a list of services which may be performed using the given link; and displaying the list of services, wherein the step of displaying the list of services comprises the steps of:

displaying a standard list of services independent of the given link; and displaying one of a number of link dependent services as identified by the given link, wherein the number of link dependent services includes services provided by businesses identified by the links.

2. A method for providing access to services when a Web page is accessed by a user comprising the steps of:

receiving a URL code from a user;

retrieving a set of links from the Web page identified by the URL code;

displaying the list of links;

receiving a user selection of a given one of the links from the list of links;

retrieving a list of services which may be performed using the given link; and displaying the list of services, wherein the step of displaying the list of services comprises the steps of:

displaying a standard list of services independent of the given link; and displaying one of a number of link dependent services as identified by the given link, wherein the number of link dependent services include services provided by owners of content in documents identified by the links.

3. A method for providing access to services when a Web page is accessed by a user comprising the steps of:

receiving a URL code from a user;

retrieving a set of links from the Web page identified by the URL code;

displaying the list of links;

receiving a user selection of a given one of the links from the list of links;

retrieving a list of services which may be performed using the given link; and displaying the list of services, wherein the step of displaying the list of services comprises the steps of:

displaying a standard list of services independent of the given link; and displaying one of a number of link dependent services as identified by the given link, wherein the number of link dependent services include services which perform functions dependent on the type of formatting of the Web page identified by the link.

4. The method of claim 3, wherein the one of the types of formatting comprises a portable document format (pdf).

5. A method for providing access to services when a Web page is accessed by a user comprising the steps of:

receiving a URL code from a user;

retrieving a set of links from the Web page identified by the URL code;

displaying the list of links;

receiving a user selection of a given one of the links from the list of links;

retrieving a list of services which may be performed using the given link; and displaying the list of services, wherein the list of services includes email of the given link bundled with the list of services which may be performed using the given link.

6. A method for providing access to services when a Web page is accessed by a user comprising the steps of:

receiving a URL code from a user;

retrieving a set of links from the Web page identified by the URL code;

displaying the list of links;

receiving a user selection of a given one of the links from the list of links;

retrieving a list of services which may be performed using the given link; and displaying the list of services, wherein the step of displaying the list of services comprises the step of:

displaying a standard list of services; and displaying a list of services dependent on a configuration of the display.

7. The method of claim 6, wherein the display is provided on a device consisting of one or more of the following:

an Internet phone;

a personal digital assistant; and a two way pager.

* * * * *